United States Patent
Roggendorf et al.

(10) Patent No.: US 9,407,357 B1
(45) Date of Patent: Aug. 2, 2016

(54) SYSTEMS AND METHODS FOR RADIO NODE SYNCHRONIZATION BASED ON RANGE CALCULATIONS

(75) Inventors: Brian R. Roggendorf, Marion, IA (US); Steven P. Phillips, Gilbert, AZ (US); Jason D. Block, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 627 days.

(21) Appl. No.: 12/475,272

(22) Filed: May 29, 2009

(51) Int. Cl.
*H04B 7/26* (2006.01)
*H04W 56/00* (2009.01)

(52) U.S. Cl.
CPC ............ *H04B 7/2687* (2013.01); *H04B 7/2693* (2013.01); *H04W 56/0015* (2013.01); *H04W 56/00* (2013.01); *H04W 56/001* (2013.01)

(58) Field of Classification Search
CPC ..... H04W 88/08; H04W 52/08; H04W 52/12; H04W 52/16; H04W 52/24; H04W 52/241; H04W 52/248; H04W 52/322; H04W 52/325; H04W 52/40; H04W 52/50; H04W 52/56; H04W 52/60; H04W 92/10; H04W 92/12; H04B 2201/70701; H04B 2201/70703; H04B 7/2618; H04B 7/2628; H04B 1/1036; H04B 1/7117; H04B 1/712; H04B 2201/7071; H04B 2203/5495; H04B 3/542
USPC .................. 455/502, 516, 13.2, 456.1, 404.2; 342/387; 370/508, 509, 278, 280, 338
See application file for complete search history.

(56) References Cited

U.S. PATENT DOCUMENTS

| | | | |
|---|---|---|---|
| 4,355,404 A | 10/1982 | Uzunoglu | |
| 4,654,864 A | 3/1987 | Ichiyoshi | |
| 6,366,574 B1 | 4/2002 | Baissus et al. | |
| 6,473,420 B1 | 10/2002 | Bourdeau et al. | |
| 7,050,482 B2 | 5/2006 | Imai et al. | |
| 7,119,676 B1 | 10/2006 | Silverstrim et al. | |
| 7,187,903 B1 * | 3/2007 | Febvre et al. | 455/13.2 |
| 7,333,529 B2 | 2/2008 | Imai et al. | |
| 7,333,824 B2 * | 2/2008 | Zhang et al. | 455/502 |
| 7,400,894 B2 * | 7/2008 | Ebner et al. | 455/502 |
| 2003/0087654 A1 * | 5/2003 | Wheeler | 455/502 |
| 2004/0072582 A1 * | 4/2004 | Aljadeff et al. | 455/456.1 |
| 2005/0026637 A1 * | 2/2005 | Fischer et al. | 455/502 |
| 2005/0096066 A1 * | 5/2005 | Lee | 455/456.1 |
| 2008/0095123 A1 * | 4/2008 | Kuroda | H04B 3/542 370/336 |
| 2008/0316961 A1 * | 12/2008 | Bertrand et al. | 370/329 |
| 2009/0312034 A1 * | 12/2009 | Burroughs et al. | 455/456.1 |
| 2010/0259448 A1 * | 10/2010 | Qahwash et al. | 342/387 |

* cited by examiner

*Primary Examiner* — Golam Sorowar
(74) *Attorney, Agent, or Firm* — Donna P. Suchy; Daniel M. Barbieri

(57) ABSTRACT

A radio node for updating a local timing parameter based on a message from a remote node includes a processing circuit and receiver. The receiver is configured to receive the message and to provide the message to the processing circuit. The processing circuit is configured to determine an expected time of arrival for the received message using an estimation of range between the radio node and the remote node. The processing circuit is further configured to obtain an estimate of a timing error for the radio node by comparing the expected time of arrival with the actual time of arrival. The processing circuit is further configured to determine a timing error quality using position uncertainty information and time uncertainty information received from the remote node with the received message.

15 Claims, 4 Drawing Sheets

Expected TOA = <u>Calculated Distance Between Local Node (A) and Remote Node (B)</u>
Speed of Light Expected TOA = <u>Calculated Distance Between Local Node (A) and Remote Node (B)</u>
Speed of Light Expected TOA = <u>Known Distance Between Local Node (E) and Remote Node (F)</u>
Speed of Light

SYSTEMS AND METHODS FOR RADIO NODE SYNCHRONIZATION BASED ON RANGE CALCULATIONS

BACKGROUND

The present disclosure generally relates to the field of wireless communications. The present disclosure more particularly relates to radio frequency communication schemes where a plurality of radios share network resources by controllably transmitting during certain time periods. One such radio frequency communication scheme is called a time division multiple access (TDMA) channel access method. In TDMA, multiple radio nodes may share the same network frequencies (e.g., the same channel) by dividing a frame into individual time slots. Each radio node transmits within its own assigned time slot so as to avoid collisions with other transmissions. Such a scheme requires that the radio nodes of the network be synchronized to a common time (i.e., a network time). Some conventional nodes utilize an onboard GPS receiver to refine their internal clock. Other conventional nodes utilize other external sources (e.g., a master node, a clock of another node, etc.) to refine their internal network time. Such conventional methods of network time refinement are often impractical for networks having nodes with reduced feature sets or networks with mobile nodes.

SUMMARY

One embodiment relates to a radio node for updating a local timing parameter based on a message from a remote node. The radio node includes a processing circuit and a receiver. The receiver is configured to receive the message and to provide the message to the processing circuit. The processing circuit is configured to determine an expected time of arrival for the received message using an estimation of range between the radio node and the remote node. The processing circuit is further configured to obtain an estimate of a timing error for the radio node by comparing the expected time of arrival with the actual time of arrival. The processing circuit is yet further configured to determine a timing error quality using position uncertainty information and time uncertainty information received from the remote node with the received message.

Another embodiment relates to a method for updating a local timing parameter of a radio node based on a message from a remote node. The method includes receiving the message at a receiver and providing the message to a processing circuit. The method further includes calculating an expected time of arrival for the received message using an estimation of range between the radio node and the remote node. The method also includes calculating an estimate of a timing error for the radio node by comparing the expected time of arrival with the actual time of arrival. The method yet further includes determining a timing error quality using position uncertainty information and time uncertainty information received from the remote node with the received message. The method further includes updating a local timing parameter based on the calculated timing error and the calculated timing error quality.

Yet another embodiment relates to a radio node for updating a local timing parameter based on a message from a remote node. The radio node includes means for receiving the message and means for processing the received message. The means for processing is configured to calculate an expected time of arrival for the received message using an estimation of range between the radio node and the remote node. The means for processing is further configured to calculate an estimate of a timing error for the radio node by comparing the expected time of arrival with the actual time of arrival. The means for processing is further configured to determine a timing error quality using position uncertainty information and time uncertainty information received from the remote node with the received message. The means for processing is also configured to update a local timing parameter based on the calculated timing error and the calculated timing error quality.

Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Referring generally to the figures a radio node configured to update a local timing parameter of the radio node is shown and described. The update of the local timing parameter is based on a message received from a remote node. The radio node is configured to determine an expected time of arrival for the received message using an estimated range between the radio node and the remote node. The estimated range between the radio node and the remote node may be calculated using position information included with the received message and of the location of the remote node. The radio node is further configured to obtain an estimate of a timing error for the radio node by comparing the expected time of arrival with the actual time of arrival. The radio node is further configured to determine a timing error quality using position uncertainty information and time uncertainty information received from the remote node with the received message. The radio node then updates a local timing parameter based on the calculated timing error and the calculated timing error quality.

Figure 1:
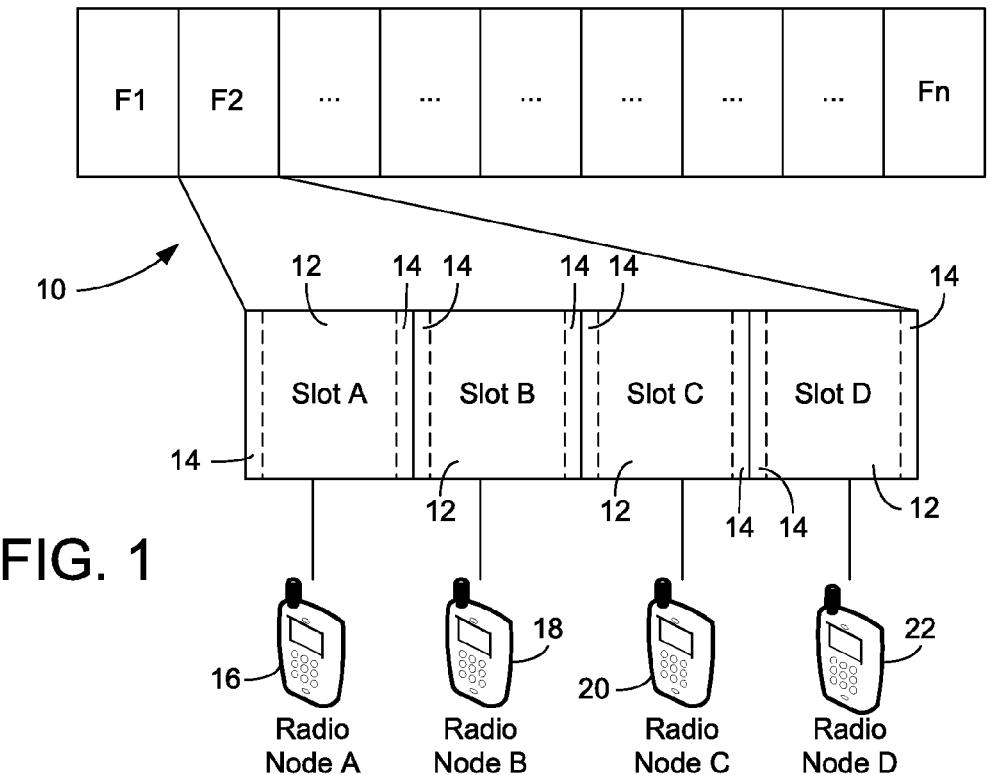
FIG. 1 is a diagram of a time division multiple access (TDMA) channel access scheme, according to an exemplary embodiment.

Referring now to FIG. 1, a diagram of a time division multiple access (TDMA) channel access scheme is shown. In a TDMA scheme, a data stream 10 is divided by time into multiple frames F1-Fn. Each frame, such as frame F2, is further divided into a number of slots during which a radio may transmit. Each slot includes a data portion 12 and one or more guard periods 14. Once a number of radio nodes 16-22 have joined a network, each is assigned to a slot in which to transmit. In FIG. 1, for example, radio node A is assigned to Slot A, and so on. Radio nodes 16-22 in the system are configured to be generally synchronized to a common network time. Accordingly, when the start of slot A begins, only radio node A will be configured to transmit a data message. If radio node A is properly timed, its transmission will occur just as the first guard period for slot A has ended so the start of the transmission time of the message is simultaneous with the start of the data portion of slot A. During guard periods 14 no radio node will transmit a data message, allowing time for transmissions and receptions to complete or to account for timing synchronization problems in the system. According to the exemplary embodiments described herein, each radio node 16-22, upon reception of transmissions from other radio nodes, is configured to conduct minor adjustments to one or more of its local timing parameters based on the content of the received data message.

Figure 2:
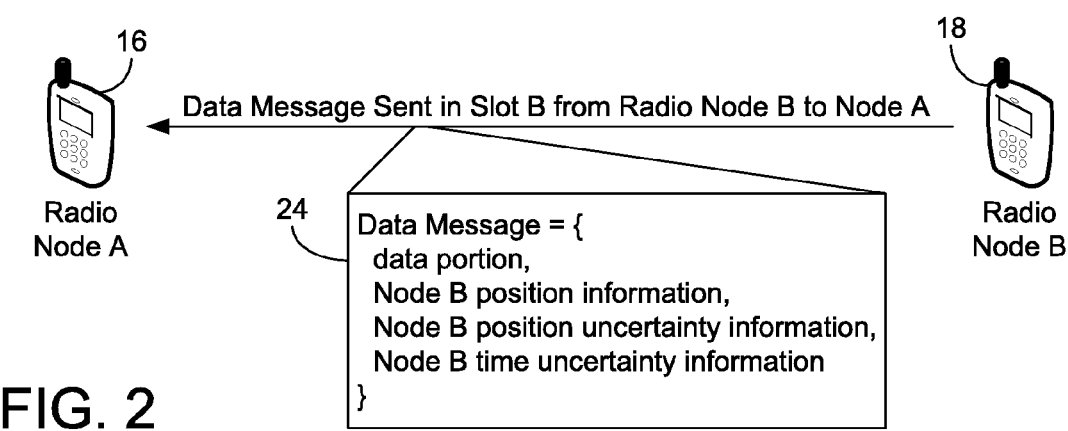
FIG. 2 is a diagram of a data message from which a radio node is configured to calculate an adjustment to a local timing parameter, according to an exemplary embodiment.

FIG. 2 illustrates an exemplary data message 24 from which radio node A (node 16) is configured to calculate an adjustment to a local timing parameter. Remote node 18 (i.e., radio node B) transmits data message 24 to radio node A in the remote node's TDMA slot. Data message 24 is illustrated to include a data portion, Node B position information, Node B position uncertainty information, and Node B time uncertainty information. In other embodiments or in some situations, data message 24 may not include a data portion (i.e., data payload) in addition to the time and position uncertainty information. Radio node A is configured to use this received information, in addition to knowledge of its own position, to calculate an update for one or more of its local timing parameters.

Figure 3:
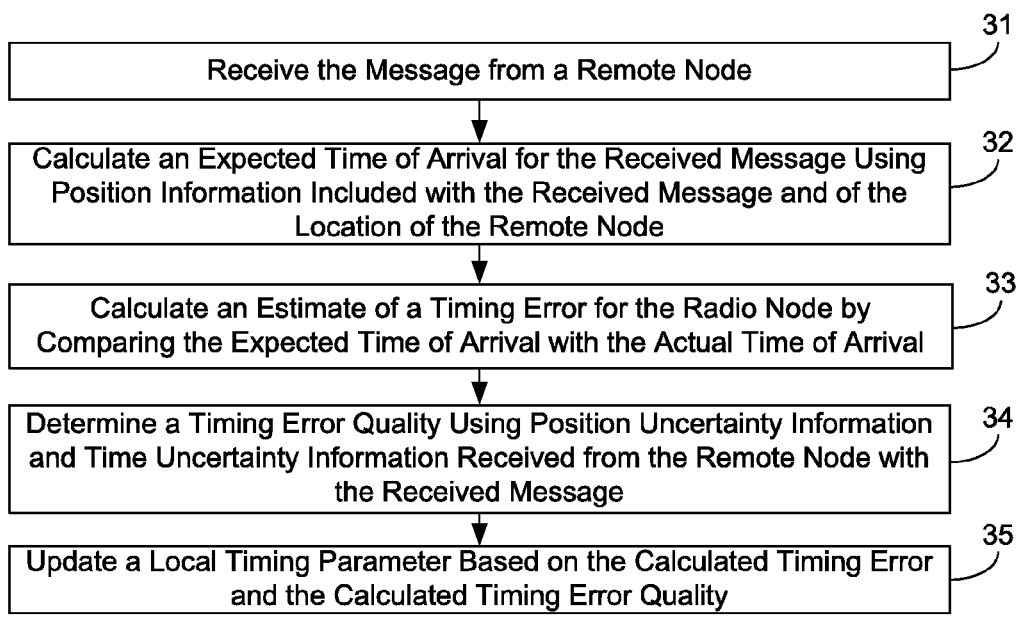
FIG. 3 is a flow chart of a process for updating a local timing parameter of a first node based on a message from a remote node, according to an exemplary embodiment.

FIG. 3 is a flow chart of a process 30 for updating a local timing parameter of a first node (e.g., radio node A shown in FIG. 2) based on a message (e.g., data message 24) from a remote node (e.g., remote node B shown in FIG. 2), according to an exemplary embodiment.

Process 30 is shown to include receiving a message from the remote node (step 31). In an exemplary embodiment, the message is transmitted from the remote node and received by the first node in the remote node's time slot. Accordingly, the message is a "normal" TDMA transmission and is not an extra transmission on the network. In an exemplary embodiment, every radio node on the network is configured to transmit its position, its position uncertainty, and its time uncertainty with every data message each radio node transmits.

In alternative embodiments, the message may be an extra transmission on the network. For example, each node may be configured to periodically transmit a message that can be used for synchronization by one or more receiving nodes. In other alternative embodiments, the message for synchronization can be requested by the first node, requested to be transmitted (i.e., pushed) by a user of the remote node, transmitted upon the remote node's entry into the network, transmitted after the remote node has been connected to the network for a period of time, randomly transmitted in the remote node's time slot, or otherwise caused to be transmitted.

Referring still to FIG. 3, process 30 is shown to include calculating an expected time of arrival (TOA) for the received message using position information included with the received message and of the location of the remote node (step 32). According to an exemplary embodiment, the expected time of arrival is calculated by determining a distance between the first node and the remote node (e.g., distance=|position of first node−position of remote node|) and dividing the distance by the speed of light. It should be appreciated that many different calculations may be used to determine the distance between two nodes in a two or three dimensional space, depending on the application. For example, in some applications (e.g., ground-to-ground) altitude might not be taken into account while in other applications (e.g., air-to-ground, air-to-air, etc.), altitude may be considered. Time of arrival may be stored and considered as a total time of transmission (e.g., using the result of the distance divided by speed of light calculation) or converted to another value. For example, if the expected time of arrival is to be compared to absolute "real world" times in future calculations, the first radio node may be configured to add the result of the transmission time calculation to the absolute "real world" network time of the first radio node to obtain an expected time of arrival in absolute "real world" terms.

Referring further to FIG. 3, process 30 is further shown to include calculating an estimate of a timing error for the first radio node by comparing the expected time of arrival with the actual time of arrival of the message (step 33). This calculation may include any number of sub-steps, depending on the form of the actual time of arrival and the expected time of arrival. For example, the expected time of arrival or the actual time of arrival may be transformed or otherwise converted for compatibility with the calculation of a timing error.

Figure 4:
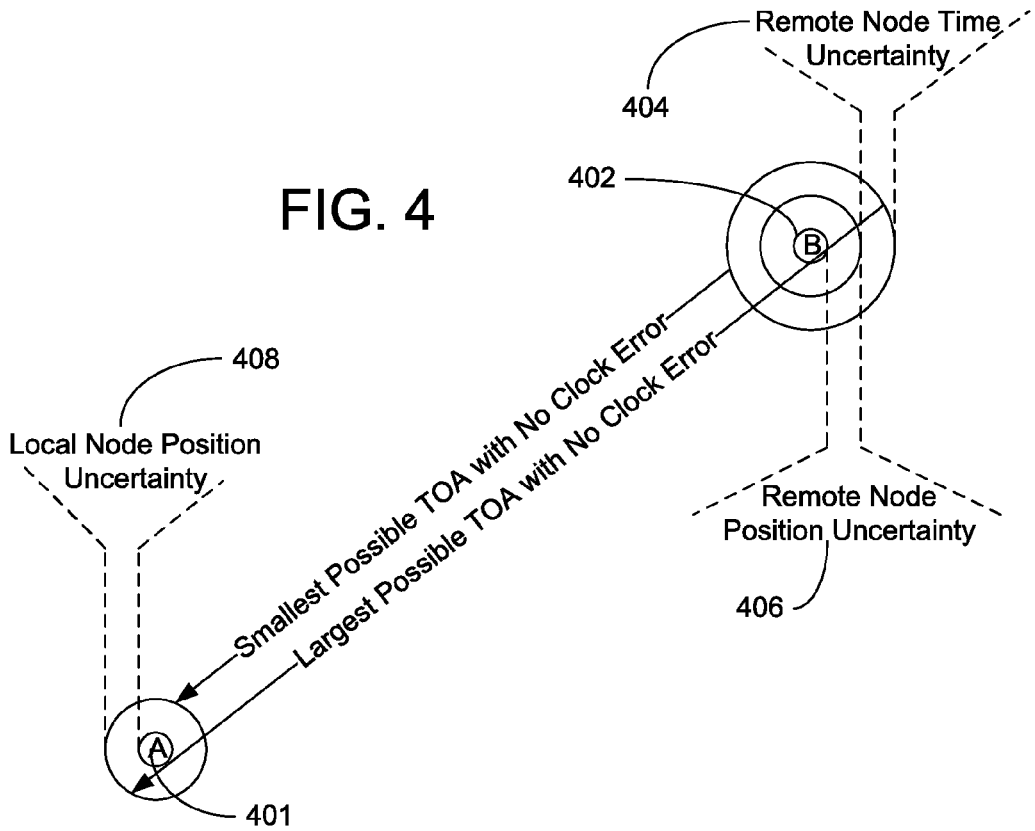
FIG. 4 is a network diagram illustrating the significance of the time and position uncertainty on the expected time of arrival calculation of the process of FIG. 3, according to an exemplary embodiment.

Process 30 is then shown to include determining a timing error quality using position uncertainty information and time uncertainty information received from the remote node with the received message (step 34). The timing error quality may be a scalar, a percentage, or another value that can be used by the system to describe the potential effect of these "errors" (i.e., position uncertainty, time uncertainty, etc.) on the estimate of the timing error. FIG. 4 illustrates the significance of the time and position uncertainty on the expected time of arrival calculation of step 33. Point 401 is the reported position for node A and point 402 is the reported position of node B. In an exemplary embodiment, point 401 and point 402 are the primary variables used in the calculation of the expected time of arrival. As illustrated, however, uncertainty of the remote node's time 404, uncertainty of the remote node's position 406, and uncertainty of the local node's position 408 can lead to a large differential between the largest possible TOA and the smallest possible TOA (assuming no local clock error). The calculation of step 34 is configured to quantify the certainty (i.e., quality) of the TOA estimation obtained using points 401 and 402. The calculation of step 36 may provide an absolute potential time differential (e.g., plus or minus X nanoseconds) or a statistically adjusted value. For example, in some embodiments the calculation of step 34 includes determining the standard deviation of the uncertainties. In these embodiments, the timing error quality (TEQ) may be calculated using, for example:

$$TEQ = \sqrt{(RNtu)^2 + (RNpu)^2 + (LNpu)^2}$$

where RNtu is the timing uncertainty of the remote node, RNpu is the position uncertainty of the remote node, and LNpu is the position uncertainty of the local node.

Process 30 shown in FIG. 3 is further shown to include the step of updating a local timing parameter based on the calculated timing error and the calculated timing error quality (step 35). For example, the timing error may be used to update an internal clock (e.g., move the internal clock ahead by some units of time or behind by some units of time). For example, if the expected time of arrival is 0.00528 seconds and the actual arrival time was 0.00527 seconds, the radio node might be configured to move its internal clock forward by 0.00001 seconds (e.g., so that in the next similar situation the expected time of arrival should be more equal to the actual time of arrival). In an exemplary embodiment, rather than moving a clock forward or back, the timing parameter updated is an offset that can be changed or adjusted based on timing error calculations.

The use of the calculated timing error quality may vary according to different embodiments. For example, rather than moving the internal clock forward by the entire 0.00001 second difference between expected and actual arrival, the timing error quality value may indicate that some of that difference might not be due to clock differences and discarded. Accordingly, if the timing error quality is a standard deviation based on three uncertainties (remote node position uncertainty, remote node timing uncertainty, and local node position uncertainty) then the amount of the clock adjustment may be reduced by, for example, that standard deviation. In other embodiments, the uncertainties may be added together in terms of nanoseconds (or any other unit) and the aggregate subtracted from the timing error. If the timing error quality subtracted from the timing error equals a negative number, the system may be configured to conduct no adjustment of the timing parameter (e.g., the uncertainty is greater than the calculated expected vs. actual arrival difference). In other embodiments, each uncertainty (remote node position uncertainty, remote node timing uncertainty, local node position uncertainty) might be weighted differently in a calculation to determine an amount of a local timing parameter update. For example, step 35 may include a consideration of the local node's position uncertainty and the local node's current time uncertainty in determining how to use the timing error or the calculated timing error quality. Other systems may be configured to smooth timing error determinations and/or timing error quality determinations over time and to periodically update the local timing parameter based on the result of the smoothing.

Figure 5:
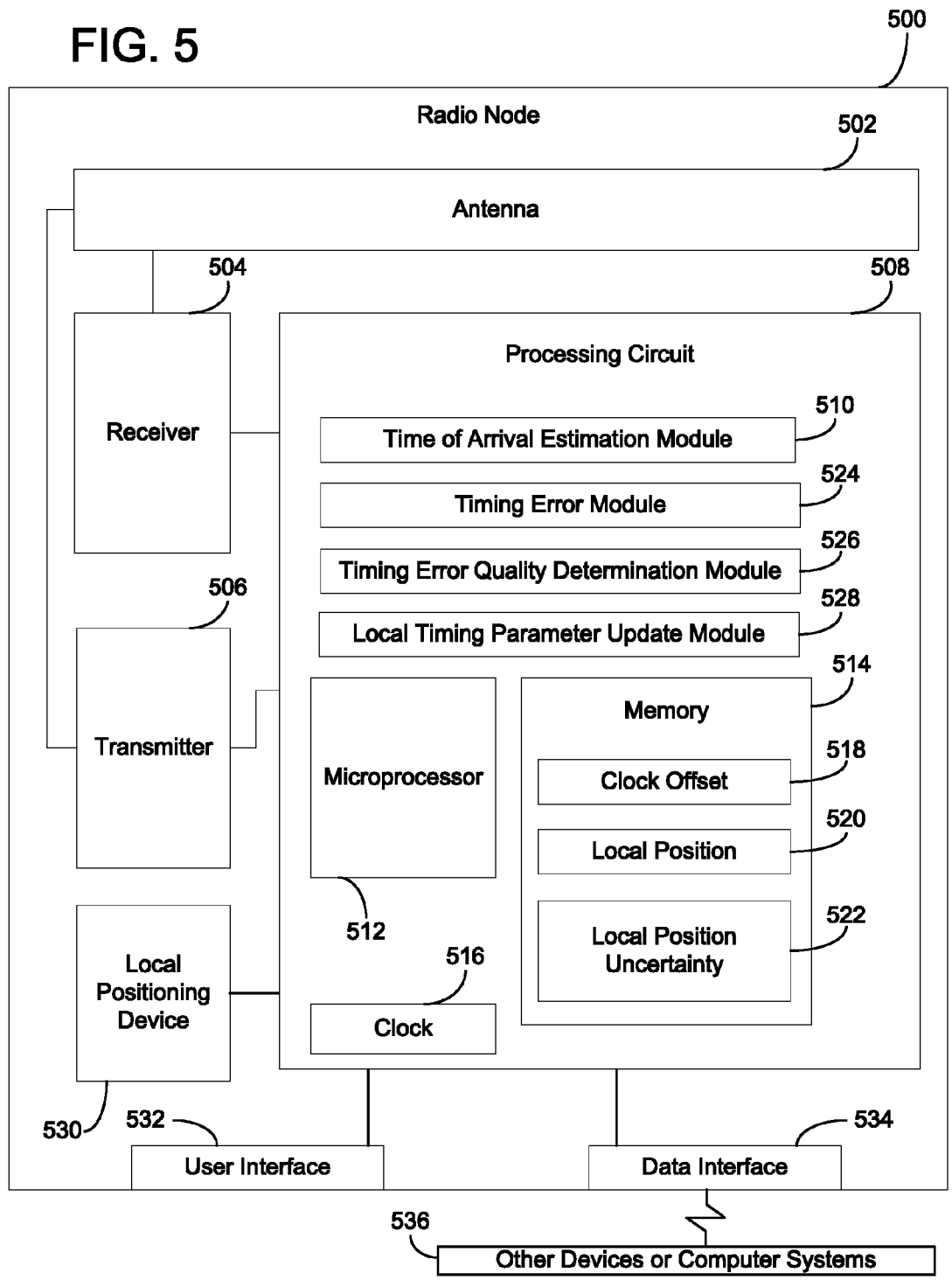
FIG. 5 is a block diagram of a radio node, according to an exemplary embodiment.

Referring now to FIG. 5, a block diagram of a radio node 500 is shown, according to an exemplary embodiment. Radio node 500 is shown to include an antenna 502, a receiver 504, a transmitter 506, and a processing circuit 508. Antenna 502 is any element or elements configured to receive electromagnetic energy from radio waves and to provide signals representative of the energy to receiver 504 for demodulation, decoding, or other interpretation. Receiver 504 may be any type of radio frequency receiver. For example, receiver 504 may be a LINK 16 receiver, a mobile phone receiver, or a receiver configured to receptions according to other wireless standards or protocols. Accordingly, receiver 504 may include any number of amplifiers, filters, decoders, demodulators, or other components or circuits configured to support receiver 504 and its reception capabilities.

Although transmitter 506 is separately shown in FIG. 5, it should be appreciated that in some embodiments transmitter 506 may be integrated with receiver 504 (e.g., as a transceiver) or absent from the radio node (i.e., if radio node 500 is a receiver without a transmit capability). Accordingly, any mention of "receiver" throughout this application, including the claims, is intended to mean a standalone receiver as well as a transceiver having receive capabilities. Further although receiver 504 and transceiver 506 are shown as relatively discrete blocks in FIG. 5, it should be appreciated that antenna 502, receiver 504, transmitter 506, and processing circuit 508 may be more integrated than is shown in FIG. 5. For example, portions of an integrated circuit or other component of receiver 504 may be considered portions of processing circuit 508, or vice-versa. By way of further example, even if time of arrival estimation module 510 is more integrated with receiver 504 than other modules, the time of arrival estimation module 510 may still be considered a part of processing circuit 508.

Processing circuit 508 may be distributed throughout radio node 500, included on a single printed circuit board, distributed onto a plurality of printed circuit boards, included with a single integrated circuit or otherwise configured. Processing circuit 508 may utilize any number of analog or digital circuitry components not shown in FIG. 5 to facilitate the activities described herein. For example, processing circuit 508 may include a power source and power supply circuitry for delivering power to the components of radio node 500.

Processing circuit 508 may include one or more microprocessors 512 configured to serve as the master controller for the circuit, to execute instructions stored in memory or within the modules of processing circuit 508, or to effect any number of low level tasks (e.g., the reading and writing of information to memory, etc.). Memory 514 may be any combination of circuitry configured to store information for use by processing circuit 508. Memory 514 may be random access, direct access, or a type for access via any other method. Memory 514 may be flash memory, may include read-only memory, or may otherwise be configured. Memory 514 may be volatile, non-volatile, or include both volatile and non-volatile memory. Memory 514 may be configured to store computer code, scripts, or other instructions for execution by microprocessor 512. Depending on the configuration of processing circuit 508, memory 514 may also include one or more of the modules shown in processing circuit 508. In such an embodiment, each module may be computer code for configuring microprocessor 512 to conduct the activity or activities described for each module when executed. In other embodiments the modules of processing circuit 508 may be integrated circuits or other hardware elements separate from memory 514 configured to provide the features for that module described herein.

Processing circuit 508 is further shown to include clock 516. Clock 516 may include an oscillator or other clock generation components in addition to logical circuitry and/or memory that stored time-of-day or another time accumulation. As described previously, processing circuit 508 may adjust clock 516 to account for a determined timing error. This adjustment may be an adjustment to an accumulated value (e.g., adding a number of nanoseconds to the current time-of-day), an adjustment of a clock speed, or any other adjustment configured to provide radio node 500 with a more accurate time relative to network time. For example, memory 514 is shown to include clock offset 518. Accordingly, rather than adjusting clock 516 directly (e.g., which may be the primary system clock for radio node 500), clock offset 518 may be maintained, updated in memory 514, and used by processing circuit 508 (and/or receiver 504, transmitter 506) in its network activities that rely on timing (e.g., transmission and reception in the correct slot time).

To implement the process shown in FIG. 3 or other similar processes of the present application, processing circuit 508 is shown to include time of arrival estimation module 510. Time of arrival estimation module 510 is configured to utilize local position information and remote node position information to calculate a range-based time of arrival estimation. In some embodiments, time of arrival estimation module 510 may be configured to provide the activity described above with reference to step 32 of FIG. 3. Other calculations may be utilized by time of arrival estimation module 510 to arrive at an estimated time of arrival for a data message, packet, or other transmission from a remote node. For example, referring briefly to FIG. 6, rather than deriving range via two position variables, range may be known via user input or a direct range measurement process). The estimation, as previously noted, may be completed by dividing the calculated or known range by the rate of propagation of the radio wave for the intended application (which may vary or be other than the speed of light depending on the application; e.g., urban applications, water-involved applications, mountainous applications, water-to-ground, water-to-water, water-to-air, etc.). As previously noted the modules of processing circuit 508, including module 510, may be hardware circuitry, computer code stored in memory for execution by a processor, or a combination thereof depending on the application and the particular circuitry of the radio.

Local position for use by the time of arrival estimation module 510 may be provided to the time of arrival estimation module 510 via a number of different ways, according to various exemplary embodiments. In some embodiments, for example, a local positioning device 530 may be coupled to or included within processing circuit 508 and configured to update a position for providing to module 510 as radio node 500 moves. For example, local positioning device 530 may be a global positioning system (GPS) or another global navigation satellite system (GNSS) receiver. Local positioning device 530 may include or be supplemented by a dead-reckoning component to continue updating the position even if quality receptions from an external positioning system are unavailable. In other embodiments, radio node 500 may operate via triangulation activities using receiver 504. In such embodiments, radio node 500 may not include local positioning device 530. In other embodiments radio node 500 may require position to be supplied via a user interface 532 (e.g., a user enters latitude and longitude information, a user enters GPS coordinates, a user enters a precisely measured coordinate based on output from another measurement system, etc.). It should be appreciated that user interface 532 may be dedicated to the task of position entry or a general purpose user interface system, element or set of elements. For example, user interface 532 may include a touch-screen and associated circuitry, a voice recognition system, a keypad, a dial, dials, or other tactile input, or otherwise. Position may also be received from a source external to and mobile with radio 500. For example, if radio node 500 is mobile in an aircraft, radio node 500 may be configured to receive position information via data interface 534 which may be coupled to, for example, the aircraft's data bus, the aircraft's navigation system, or other avionics equipment. The position may also be obtained via other devices or computer systems 536 (e.g., an optical range-finding system, an optical positioning system, a triangulation device, a radar system, a terrain database, a weather radar system, a laptop computer, etc.). Data interface 534 may include any number of jacks, terminals, receivers (for wireless radio or optical receptions), solder points, or other devices for communicably connecting data interface 534 to another device or devices, a network, or a suitable communications bus. Data interface 534 may include communications circuitry such as filters, demodulators, or other interpreting circuitry. Data interface 534 may also be configured to receive the data messages for transmissions by radio node 500. For example, if a laptop computer or an aircraft data communications system is coupled to radio node 500 via data interface 534, radio node 500 may be used to transmit data messages for the laptop or the aircraft data communications system. Similarly, the laptop, aircraft data communications system, or other device may be provided data messages received at radio node 500 via receiver 504.

Timing error module 524 is configured to calculate the timing error using output from time of arrival estimation module 510 and measured time of arrival for the data message (i.e., actual time of arrival). Timing error module 524 may be or include hardware circuitry, computer code stored in memory for execution by a processor, or a combination thereof depending on the application and the particular circuitry of the radio. Timing error module 524 may be configured to provide a calculation and output as described above with reference to step 33 of FIG. 3.

Timing error quality determination module 526 is configured to quantify or otherwise describe the quality of the timing error determined by module 524. Timing error quality determination module 526, according to an exemplary embodiment, utilizes local position uncertainty 522, remote node position uncertainty, and remote node timing uncertainty as inputs. In other exemplary embodiments fewer or greater inputs may be provided to timing error quality determination module 526. For example, in an embodiment where range between the radio node is directly measured (i.e., rather than derived from two position points) timing error quality determination module 526 may only consider range uncertainty and remote node timing uncertainty. In yet other embodiments, timing error quality determination module 526 may consider additional values such as an environmental adjustment (e.g., for a wave propagation delay that would skew the time of arrival estimation, etc.), etc. Timing error quality determination module 526 may be or include hardware circuitry, computer code stored in memory for execution by a processor, or a combination thereof depending on the application and the particular circuitry of the radio. Timing error quality determination module 526 may be configured to provide a calculation and output as described above with reference to step 34 of FIG. 3. In an exemplary embodiment, timing error quality determination module 526 may consider multiple timing error calculations and determine a variance, average, smoothed output, standard deviation, or other value for use by local timing parameter update module 528.

Local timing parameter update module 528 is configured to use the timing error determined by module 524 and the timing error quality determined by module 526 to update a local timing parameter of radio node 500. In an exemplary embodiment, local timing parameter update module 528 may be configured to provide calculation or output as described above with reference to step 35 of FIG. 3. Local timing parameter update module 528 may be or include hardware circuitry, computer code stored in memory for execution by a processor, or a combination thereof depending on the application and the particular circuitry for the radio. In one embodiment, for example, local timing parameter update module 528 may be configured to update the local timing parameter based on smoothing a plurality of timing error measurements over time. In some implementations of such embodiments the smoothing is conducted using a Kalman filter. The Kalman filter may use the timing error quality as an input to the Kalman filter (e.g., to adjust the confidence the Kalman filter places in the timing error measurements to predict the true timing error). In other embodiments the local timing parameter update module 528 may be configured to conduct a much more simple update (e.g., a straight substitution of a previous time for time adjusted by the calculated timing error, a substitution of the previous clock offset for a new clock offset, a threshold determination, or the like).

Referring still to FIG. 5, it should be noted that transmitter 506 may be used to propagate timing information to other radio nodes. For example, using transmitter 506, radio node 500 may be configured to provide the data message including the timing uncertainty information as described herein (i.e., remote node B shown in FIG. 2). According to an envisioned system of radio nodes, each radio node of the system is configured to calculate a timing error quality value and to transmit the timing error quality with data messages in the radio node's usual transmit slot time—allowing receiving nodes to conduct the activities described herein. Each node may also be configured to transmit its timing error, its position, its position uncertainty, or other values for allowing other nodes to calculate a range to the node or to calculate any number of timing parameters. These transmissions, in some embodiments, may be completed outside of a radio node's usual transmit slot time. In other embodiments, radio node 500 configured to refrain from transmitting via transmitter 506 unless commanded by a user. In yet other embodiments, radio node 500 does not include a transmitter. In some exemplary embodiments, the processing circuit is configured to determine the timing error and the timing error quality without a transmission from the radio node to the remote node; only a reception.

In other embodiments, processing circuit 508 may be configured to cause transmitter 506 to propagate a new network time parameter to another node or via a broadcast to any listening nodes. In yet other embodiments, processing circuit 508 may be configured to provide timing error quality and the timing error to other nodes.

Figure 6:
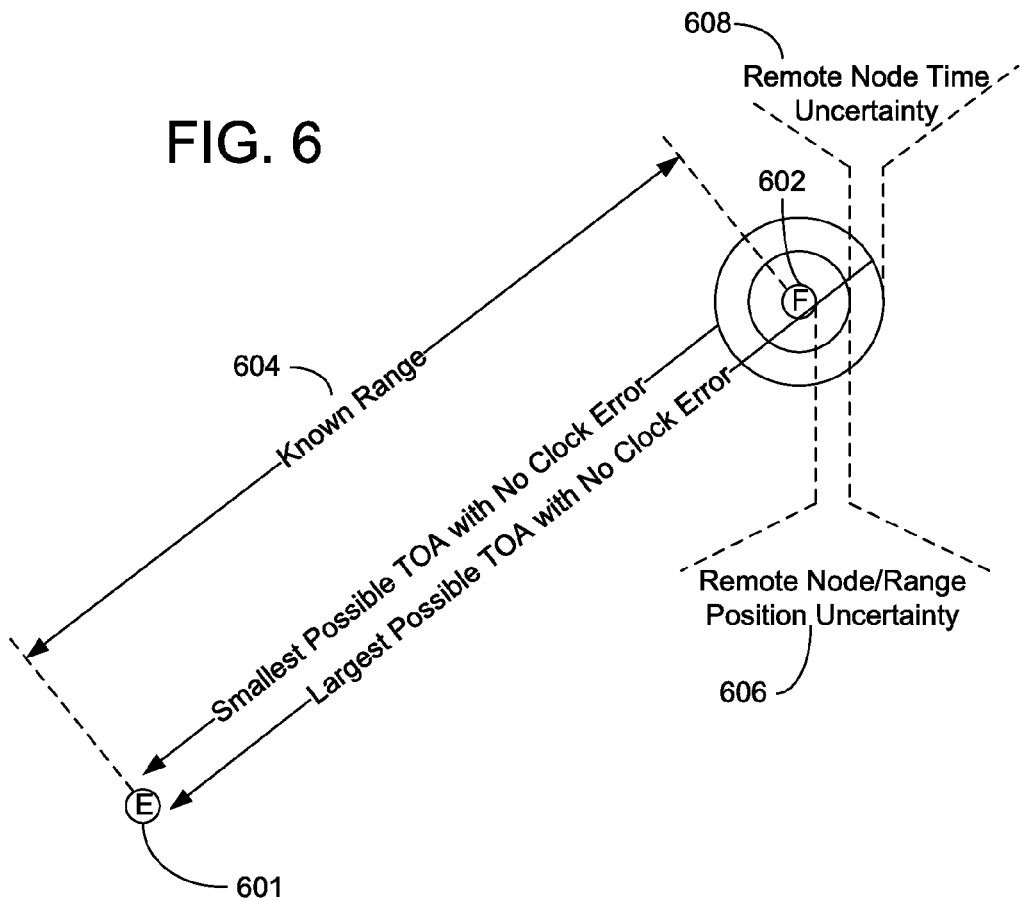
FIG. 6 is a network diagram showing possible transmission propagation uncertainties that may affect the actual time of arrival, according to an alternative embodiment.

Referring now to FIG. 6, a network diagram of an alternative embodiment is shown. In the embodiment shown in FIG. 6, node 601 (i.e., labeled node E) includes a device which provides node E with directly measured knowledge of the range between node 601 and node 602 (i.e., labeled node F). In some such embodiments, neither device must have knowledge of its geo-oriented position. For example, node 601 may include or be coupled to an optical (e.g., laser) range-finder for directly evaluating the range between other nodes in a direct line-of-sight. In other embodiments, node 601 may receive range information from a radar system, a sonar system, or another system that utilizes electromagnetic energy to determine the range to another object. When range is directly calculated, two position uncertainties (one for the local node and one for the remote node) do not exist. Rather, only a range uncertainty exists and should be evaluated by the system in the timing error quality determination. Radio frequency transmissions of the radio node to the remote node may also be used to evaluate range, according to some exemplary embodiments. For example, outside of a normal data transmission activity the local node may conduct a series of tests to determine the approximate range to another node and use the range in timing error determinations and activities as described throughout this application. In other embodiments, the locations of two radio nodes may be surveyed and the two surveyed points may be compared, for example, to information in a lookup table to determine an estimated range or time of arrival.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A radio node for updating a local timing parameter based on a message from a remote node, the radio node comprising:
 a processing circuit; and
 a receiver configured to receive the message and to provide the message to the processing circuit;
 wherein the processing circuit is configured to determine an expected time of arrival for the received message using an estimation of range between the radio node and the remote node;
 wherein the processing circuit is further configured to obtain an estimate of a timing error for the radio node by comparing the expected time of arrival with the actual time of arrival;
 wherein the processing circuit is further configured to determine a timing error quality using position uncertainty information and time uncertainty information of the remote node received from the remote node with the received message;

wherein the processing circuit is further configured to update the local timing parameter based on the calculated timing error and the calculated timing error quality, the processing circuit configured to estimate the range between the radio node and the remote node using position information included with the received message and of the location of the remote node and using a location for the radio node, the processing circuit configured to disregard the timing error when the calculated timing error quality is high; and wherein the processing circuit varies a weight of the calculated timing error on the update of the local timing parameter utilizing the calculated timing error quality.

2. The radio node of claim 1, wherein the processing circuit is configured to smooth a plurality of timing error measurements over time and to update the local timing parameter based on the result of the smoothing.

3. The radio node of claim 1, wherein the processing circuit is configured to smooth the plurality of timing error measurements over time using a Kalman filter.

4. The radio node of claim 3, wherein the processing circuit is configured to utilize the timing error quality as an input to the Kalman filter.

5. The radio node of claim 1, further comprising a transmitter.

6. The radio node of claim 5, wherein the processing circuit is further configured to provide the timing error quality to the transmitter for transmission with a data message to another node, and wherein the timing error quality is used as the remote node timing uncertainty for a third node.

7. The radio node of claim 5, wherein the processing circuit is further configured to provide the updated local timing parameter to the transmitter for transmission with a data message to another node.

8. The radio node of claim 5, wherein the processing circuit is further configured to provide position information to the transmitter for transmission with a data message.

9. The radio node of claim 5, wherein the radio node is configured to refrain from transmitting via the transmitter unless commanded by a user.

10. The radio node of claim 5, wherein the timing error and the timing error quality are determined without a transmission from the radio node to the remote node.

11. The radio node of claim 1, wherein the radio node does not include a transmitter.

12. The radio node of claim 1, wherein the local timing parameter is at least one of a local timing uncertainty value, a local time for the radio node, and a local timing offset.

13. A method for updating a local timing parameter of a radio node based on a message from a remote node, the method comprising:
  receiving the message at a receiver and providing the message to a processing circuit;
  calculating an expected time of arrival for the received message using an estimation of range between the radio node and the remote node;
  calculating an estimate of a timing error for the radio node by comparing the expected time of arrival with the actual time of arrival;
  determining a timing error quality using position uncertainty information and time uncertainty information of the remote node received from the remote node with the received message;
  updating the local timing parameter based on the calculated timing error and the calculated timing error quality;
  varying the weight of the calculated timing error on the update of the local timing parameter utilizing the calculated timing error quality; and
  disregarding the timing error when the calculated timing error quality is high.

14. The method of claim 13, further comprising:
  estimating the range between the radio node and the remote node using position information of the location of the remote node and included with the received message;
  wherein the local timing parameter comprises at least one of a timing uncertainty value, a local time for the radio node, and a timing offset.

15. A radio node for updating a local timing parameter based on a message from a remote node, the radio node comprising:
  means for receiving the message;
  means for processing the received message;
  wherein the means for processing is configured to calculate an expected time of arrival for the received message using an estimation of range between the radio node and the remote node;
  wherein the means for processing is further configured to calculate an estimate of a timing error for the radio node by comparing the expected time of arrival with the actual time of arrival;
  wherein the means for processing is further configured to determine a timing error quality using position uncertainty information and time uncertainty information of the remote node received from the remote node with the received message;
  wherein the means for processing is further configured to update a local timing parameter based on the calculated timing error and the calculated timing error quality and to vary a weight of the calculated timing error on the update of the local timing parameter utilizing the calculated timing parameter; and
  wherein the means for processing is further configured to disregard the timing error when the calculated timing error quality is high.

* * * * *